A. Sinclair,
Broom.
No. 92,483.   Patented July 13, 1869.
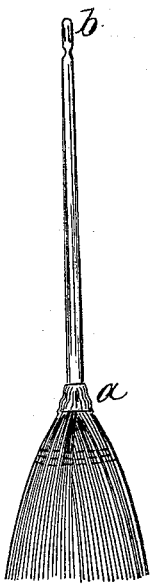
Witness
Henry C. Houston
Wm. Frank Seavey
Inventor
Albert Sinclair
by his atty W. A. Clifton

United States Patent Office.

ALBERT SINCLAIR, OF WEST WATERVILLE, MAINE.

Letters Patent No. 92,483, dated July 13, 1869.

IMPROVED BROOM.

The Schedule referred to in these Letters Patent and making part of the same.

*To all whom it may concern:*

Be it known that I, ALBERT SINCLAIR, of West Waterville, in the county of Kennebec, and State of Maine, have invented a new and useful Improved Broom; and I hereby declare the following to be a full, clear, and exact description thereof, which will enable others to make and use my invention, reference being had to the accompanying drawings, forming part of this specification, in which is shown a side elevation of an ordinary broom, having my improvement connected therewith.

I am aware of a number of patents upon brooms, and improvements thereon, in which metal bands, or cones, or cylinders, are employed to surround and bind the upper part of the brush of the broom, some of them embodying means of screwing and otherwise attaching the brush to the handle.

Without specifying, in particular, such patents, I desire to disclaim these improvements, and to specify that my improvement is different from these, in the respect that it does not consist in a method of attaching the brush to the handle of a broom, but seeks to provide a means by which that portion of the corn or brush of the broom which is connected with the handle, and attached thereto, may be protected from wear and accidents, when thus connected, in the ordinary ways.

I take a broom of ordinary construction, or one where the corn or brush is connected to the handle by having the ends thereof wound with a cord or wire, or other common material, and the ends secured by a tack or rivet. I then slip over the handle of the broom, at the upper end thereof, and thence down over the corn or brush, where it is attached to the handle, at the lower end, a small cylinder or tube of rubber, or other elastic substance.

This cylinder is made of such size as that, in order to be placed over the corn where it is attached to the handle, it must be stretched somewhat, with the view that when the expansive force is removed, the rubber cylinder will contract, and bind closely the broom-corn where it is attached to the handle.

If necessary, the cylinder may be glued or cemented in its position.

In factories, and particularly woollen factories, where accumulations are apt to form, from the manufactured articles, underneath and around the machines, they must often be swept away. In doing this, it frequently happens that the broom is caught by the machinery, and the wire or cord, and the tack that confines the same, are torn off, whereupon, the corn, where it is attached to the handle, having nothing to confine it, falls off, and the broom becomes useless.

By enveloping this portion with my rubber cylinder, this liability is, in a great degree, removed.

In domestic use, the wire or cord and the tack, which confine the head of the corn, often bruise and scar furniture, as the broom is used. My rubber envelope prevents this.

Additional strength and firmness, where the corn and handle are united, are also imparted by the use of my rubber cylinder.

In the accompanying drawings—

*a* represents the rubber attachment, and I apply it by slipping it down over the top *b*, after the corn has been attached to the handle in the ordinary way.

I do not intend to embrace in this application any other cylinder than the rubber cylinder, constructed and applied as set forth.

What I claim as my invention, and desire to secure by Letters Patent, is—

The rubber cylinder *a*, when applied to a broom, substantially as and for the purposes herein described.

ALBERT SINCLAIR.

Witnesses:
EDWIN P. BLAISDELL,
H. H. NICKERSON.